United States Patent [19]
Armstrong

[11] 4,126,188
[45] Nov. 21, 1978

[54] WALKING TYPE AGRICULTURAL IMPLEMENT WITH HARNESS

[76] Inventor: Bernard C. Armstrong, 535 Westmoreland, Jackson, Tenn. 38301

[21] Appl. No.: 779,588

[22] Filed: Mar. 21, 1977

Related U.S. Application Data

[63] Continuation-in-part of Ser. No. 611,671, Sep. 9, 1975, Pat. No. 4,013,131.

[51] Int. Cl.² ............................................. A01B 3/02
[52] U.S. Cl. ..................................... 172/370; 280/1.5
[58] Field of Search .............. 172/41, 257, 276, 330, 172/353, 358, 370, 431, 434, 435; 280/1.5, 290; 297/274, 275, 296, 353; 403/390, 395, 398, 399

[56] References Cited
U.S. PATENT DOCUMENTS

| 636,108 | 10/1899 | Blackman | 280/290 |
|---|---|---|---|
| 1,313,200 | 8/1919 | Mundy et al. | 172/358 |
| 1,351,782 | 9/1920 | Mitchell | 172/431 |
| 1,514,361 | 11/1924 | Anderson | 280/1.5 |
| 1,589,196 | 6/1926 | McCarty | 280/1.5 |
| 2,366,231 | 1/1945 | Armstrong | 280/1.5 |
| 3,327,788 | 6/1967 | Kolpe | 172/41 X |

FOREIGN PATENT DOCUMENTS

962,382  4/1957  Fed. Rep. of Germany ........... 172/276

*Primary Examiner*—Richard T. Stouffer
*Attorney, Agent, or Firm*—Charles G. Lamb

[57] ABSTRACT

An agricultural implement including an elongated body member with a cultivating member extending downwardly therefrom at the rear thereof, a body support member attached to the front end thereof, a handle disposed therebetween and extending upwardly therefrom and, a harness attached to the body support number and the handle, the harness including a loop for hitching an operator therein.

10 Claims, 10 Drawing Figures

U.S. Patent    Nov. 21, 1978    Sheet 3 of 3    4,126,188
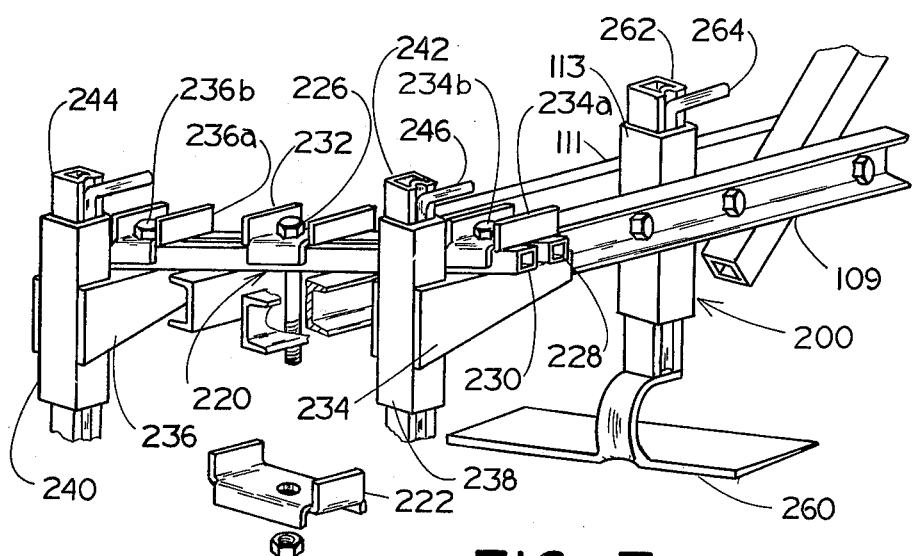
FIG. 7
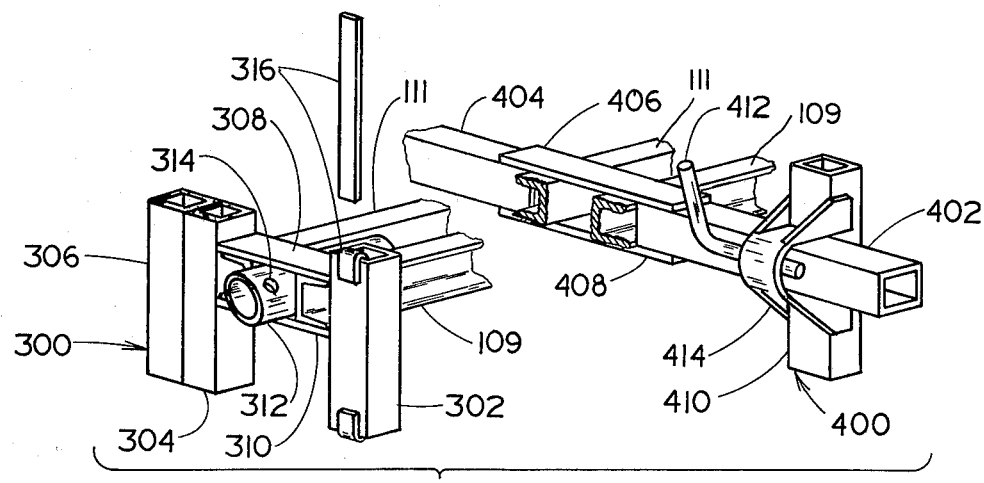
FIG. 8
FIG. 9
FIG. 10

WALKING TYPE AGRICULTURAL IMPLEMENT WITH HARNESS

CROSS REFERENCE TO RELATED APPLICATION

This is a continuation-in-part of application Ser. No. 611,671 filed Sept. 9, 1975, now U.S. Pat. No. 4,013,131.

BACKGROUND OF THE INVENTION

This invention relates to agricultural implements of the walking type and more particularly relates to an agricultural implement including a harness device adapted to be applied whereby the weight and force of the body of an operator is utilized to pull the implement.

In recent years there has been considerable activity in the development of agricultural implements and garden tools which may be manually operated. In these devices provisions are made whereby the operator may push or pull the implements and tools utilizing the weight and force of the body of the operator as the pushing or pulling means. It has been found, in devices of the pull type, force is transmitted from the hips and backs whereby less fatigue of the operator is realized because of the distribution of the pulling force from said hips and backs. Pull devices also enable the operator to walk on unplowed or untilled soil thereby preventing the packing of freshly tilled soil experienced in operating implements of the push-type. However, in most of these devices problems have arisen in that after a short period of time, fatigue and chafing of the operator set in, mostly due to improper support of the body while pulling the implement.

SUMMARY OF THE INVENTION

In the present invention, it is recognized that it is desirable to provide an agricultural implement which is manually operated whereby the operator may pull the tool while walking backwards in front of the implement. It is further recognized that it is desirable to provide a manually operated agricultural implement which cuts down on fatigue and chafing of the operator.

The present invention advantageously provides a straightforward arrangement for an agricultural implement which may be manually operated. The present invention further provides an agricultural implement which is manually operated whereby the operator may pull the implement while walking backwards. The present invention even further provides an agricultural implement of the manually operated type which provides for support for the operator when pulling the implement.

In the present invention, it has been found that by providing an elongated body member with a downwardly extending cultivating member at the back end thereof and a seat at the front thereof with a support harness attached to the seat and handle which is disposed between the seat and the cultivating member, the operator has his hands free to operate the handle member and by bending forward as the operator walks backwardly, the operator can apply pressure downwardly thereby forcing the cultivating member into the soil. Furthermore, by positioning the seat to align with the hips and lower part of the back in combination with the harness which is attached to the seat and handle means, the back and arms of the operator, forming an arch, are braced by the wide distribution of the reactionary force of the harness belts, minimizing fatigue and chafing. When pressure is released on the seat the implement hangs suspended from the shoulders and back, allowing a free swinging motion of the implement to release trash accumulated by the tines, and occasional cultivation between the plants in the row. The harness, having no rigid members in contact with the shoulders, allows freedom for the operator to pull an occasional weed or other task requiring stooping while bracing himself with one hand on the handle.

Various other features of the present invention will become obvious to those skilled in the art upon reading the disclosure set forth hereinafter.

More particularly, the present invention provides an agricultural implement of the walking type comprising: an elongated body member having a cultivating assembly attached at one end thereof and a body support assembly attached at the opposed end thereof with a handle means attached thereto and disposed between the cultivating assembly and the body support assembly; the cultivating assembly including a downwardly extending cultivating member and the elongated body member extending angularly in an upwardly direction in an operating position; and, harness means attached at one end to the body support assembly and the other end to the handle means, the harness means including means for hitching an operator therein.

It is to be understood that the description of the examples of the present invention given hereinafter are not by way of limitation. Various modifications within the scope of the present invention will occur to those skilled in the art upon reading the disclosure set forth hereinafter.

Referring to the drawings:

FIG. 7 is an enlarged perspective view of another preferred cultivating assembly for use with the agricultural implement of FIG. 4;

FIG. 8 is an enlarged perspective view of even another preferred cultivating assembly for use with an agricultural implement of FIG. 4;

FIG. 9 is an enlarged perspective view of a preferred cultivating member for the agricultural implement shown in FIG. 4; and, FIG. 10 is an enlarged perspective view of another preferred means of attaching a cultivating member to the body member of the agricultural implement shown in FIG. 4.

Figure 1:
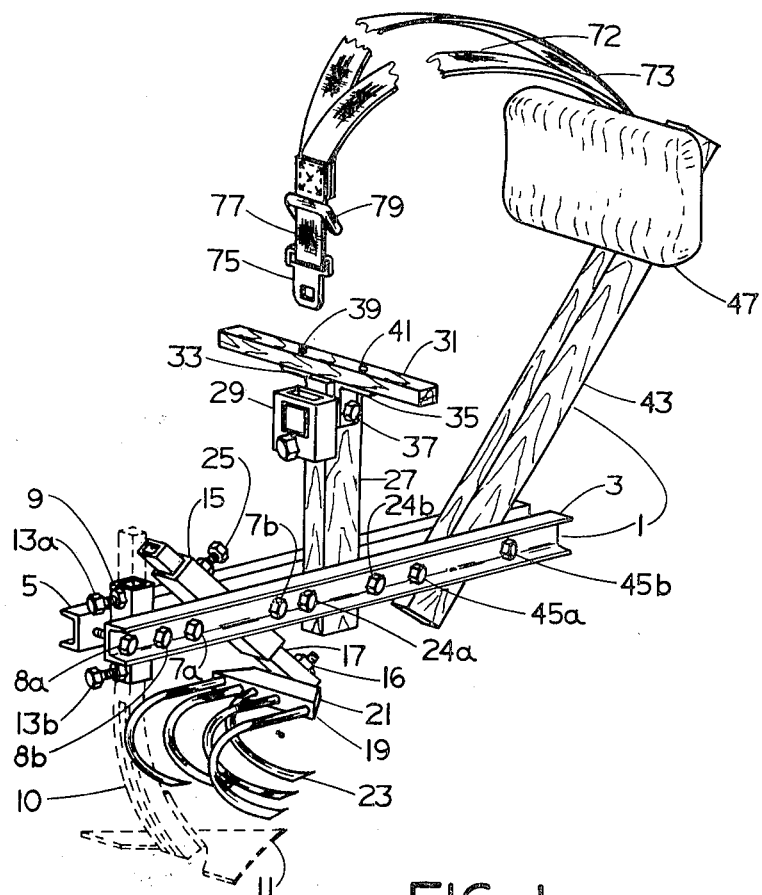
FIG. 1 is a perspective view, partially cut-away, of one agricultural implement of the present invention showing two cultivating members, one outlined with phantom lines.
Figure 2:
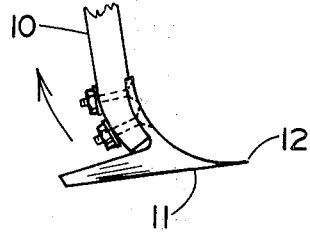
FIG. 2 is an enlarged cross-sectional view illustrating the cultivating member of FIG. 1 shown in phantom lines.

FIG. 1 shows one preferred embodiment of the present invention comprising an elongated body support member 1 which includes two spaced channel members 3 and 5, respectively, channel members 3 and 5 being attached by a plurality of bolt members, to be discussed hereinafter, which extend through aligned apertures in the channel members 3 and 5, spacing between the members 3 and 5 being predetermined as discussed hereinafter. Channel members 3 and 5 receive therebetween at the back end thereof a rectangularly-shaped tubular support member 9 which extends downwardly therefrom and substantially perpendicular thereto, support member 9 being adjustably held in position by bolt members 8a and 8b which are on opposed sides of member 9 extending through and received by aligned apertures in channels 3 and 5. Support member 9 receives a plow 11 or other cultivating device, as shown in phantom lines, therein, the plow 11 including an upwardly extending rectangular shaped tubular member 10 which has an outer periphery and configuration substantially the same as the inner periphery and configuration of the tube 9, tubular member 10 being adjustably received therein. The tube support 9 includes a pair of set screws 13a and 13b which extend through apertures therein, the distance between the plow 11 and the elongated member 1 being determined by adjusting tubular member 10 to a desired position within member 9 then tightening members 13a and 13b thereby setting the desired position of the plow 11. The tube 9 is substantially perpendicular to the elongated member 1 and the tubular member 10 turns in an angular direction toward the front end of the member 1 thereby defining the plow blade 11 with a forwardly directed cultivating point 12.

The elongated member 1 further includes a rectangularly shaped tubular support member 15 which extends angularly downwardly in a forward direction in relation to the elongated member 1. Tubular support member 15 receives in adjusting relation tubular member 17 therein, the tubular member 17 having an outer periphery of approximately the same size and configuration as the inner periphery of the tubular support member 15. Attached to the lower or downwardly extending portion of the tubular member 17 by bolt 16 is a ground working assembly 19 which includes a rearwardly extending flat plate member 21. Attached to the rear extremity of the plate member 21 is a plurality of ground working members 23 of any desired type and character generally employed in connection with agricultural implements for garden use, the ground working members 23 being illustrated as a plurality of elongated members of L-shaped configuration with the base portion of the L-extending downwardly into the ground during operations and terminating in a point whereby the ground is worked upon pulling the members 23 along or just beneath the surface thereof.

The tubular member 17 includes at least one adjusting set screw 25 therein which extends through an opening in the tubular member 15 for holding the tubular member 17 in a desired position, the position of the member 17 being determined by the desired distance between the elongated member 1 and the ground working members 23.

The tubular member 15 is of substantially the same size and configuration as the tubular member 9, tubular member 15 being held in place by tightening of the bolts 7a and 7b which are spaced at preselected positions along the channels 3 and 5 on opposite sides of tubular support 15.

Disposed approximately midway of the elongated member 1 is an upwardly extending adjustable rectangularly-shaped wood support member 27, support member 27 being disposed between and substantially perpendicular to the channels 3 and 5, the size and configuration of the rectangular support member 27 being approximately the same thickness or width as the rectangularly-shaped members 9 and 15. It is realized that even though the member 27 is shown as being wood, member 27 may be a metal tube or any other material of construction suitable for mounting a handle member thereto. The upwardly extending rectangular member 27 being the support member for the handle means is held in fixed position by the bolts 24a and 24b, respectively, which are disposed on each side thereof, bolts 24a and 24b being tightened sufficiently to prevent slippage of the member 27 once a desired position has been established. Furthermore, loosening and tightening of bolts 24a and 24b enables adjustment of the height of a handle member 31, hereinafter described.

The upwardly extending member 27 includes a harness latch receiving device 29 on the rear edge thereof, and the transversely extending handle member 31 on the top thereof, the handle member 31 being attached thereto by a pair of L-shaped brackets 33 and 35. Opposed legs of each bracket 33 and 35 are disposed on opposed sides of the tubular member 27, brackets 33 and 35 having apertures therein in alignment with mating openings (not shown) in support member 27 and attached thereto by bolt member 37. Brackets 33 and 35 are further provided with apertures on the remaining legs with bolt members 39 and 41, respectively, being received therethrough, bolt members 39 and 41 extending through aligned apertures in the handle member 31.

Figure 3:
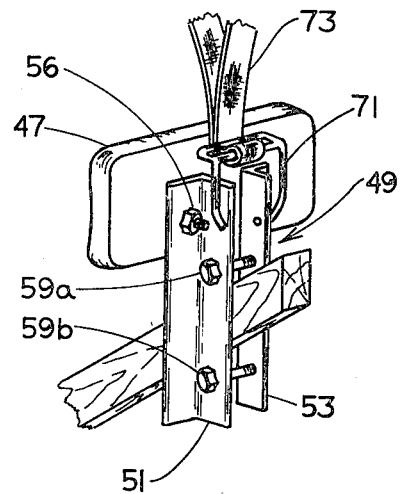
FIG. 3 is an enlarged perspective view of the seat and belt attaching means of FIG. 1.

Disposed at the front end of the elongated body member 1 is an upwardly extending rectangular-shaped member 43 which extends forward in an angularly direction, the rectangular-shaped member 43 being shown as wood but may be metal tubing or other materials of construction upon which a seat or hips support member may be placed. The thickness of the wood member 43 is approximately the same thickness as the wood member 27, as noted previously, and is held in position by bolt members 45a and 45b which extend through mating apertures in the spaced channel members 3 and 5, the spacing of these aligned apertures being preselected on opposite sides of the member 43. At the upper extremity of the member 43 is a body support mounting assembly 49 which includes a pair of L-shaped members 51 and 53 (FIG. 3), respectively, with a pair of aligned apertures (not shown) in first opposed legs, the apertures receiving bolt members 59a and 59b therethrough. Spacing between aligned apertures in the members 51 and 53 is sufficient to allow various positions of the seat mounting means. Loosening and tightening of the bolts 45a and 45b enables adjustment of the elongated rectangular member 43.

A padded vertically extending body support member 47 is attached to the mounting assembly 49 by two bolt members 56, only one being shown, which extend through apertures (not shown) in the padded support member 47 and aligned apertures in L-shaped members 51 and 53. The support member 47 generally includes a wood backing with padding attached thereto and upholstery material covering the padding and the wooded portion. Generally, any type of rectangular-shaped padded seat may be utilized in my invention, the only requirement being that it is of sufficient size to fit across the hips or lower part of the back whereby comfort as well as support for this portion of the body may be obtained.

The mounting assembly 49 is also provided with a pair of apertures therein for receiving a bolt adjusting assembly 71 for belt 73. Belt adjusting assembly 71 is generally fabricated from two steel rods bent into C-shaped configuration, one of the rods being welded to opposite sides of the base of the other C-shaped rod, the C-shaped members being perpendicular. The ends of the assembly 71 are disposed within the aforementioned aperture of L-shaped members 51 snd 53 and held securely thereto by any well known means, such as bradding, or the like, the adjusting assembly being pivotally secured therein.

The belt 73 extends around the base portions of the perpendicular C-shaped rods of belt adjusting assembly 71 forming a loop or harness as designated by the numeral 72. Belt 73 is attached to a belt winding assembly which includes a single belt member 77, a latch 75 and a winding device 79 therein for adjusting and taking up the slack between the latch 75 and the loop 73 upon insertion of the latch 75 into the latch receiving member 29. The winding device 79 may be any of those known in the art, such as those described in U.S. Pat. Nos. 3,294,340 and 3,304,024. The latch 75 and latch receiving member 29 may be any well known latch and receiving means known in the art. It is also realized that the belt 73 may comprise two belts with both belts being threaded through the belt adjusting assembly 71 with both ends of each belt being attached to the single belt member 77.

In putting the implement into use, the operator positions the elongated body member 1 between his legs with the vertically extending body support member 47 resting on the backside of the operator's hips or lower back, placing the loop 72 over the shoulder and beside the neck. The latch 75 is then inserted into the latch receiving member 29.

The position of the support member 47 for the operator is generally adjusted prior to putting the operator into the implement by loosening and then tightening bolt members 45a and 45b and 59a and 59b upon determining a comfortable position. The position of the handle member 31 is also usually adjusted prior to putting the operator into the implement by loosening and tightening of the bolt members 24a and 24b upon determining a desired position.

The implement may be used in many various ways by inserting the appropriate soil working device into either the transversely extending tubular member 9 or the angularly extending tubular member 15.

Figure 4:
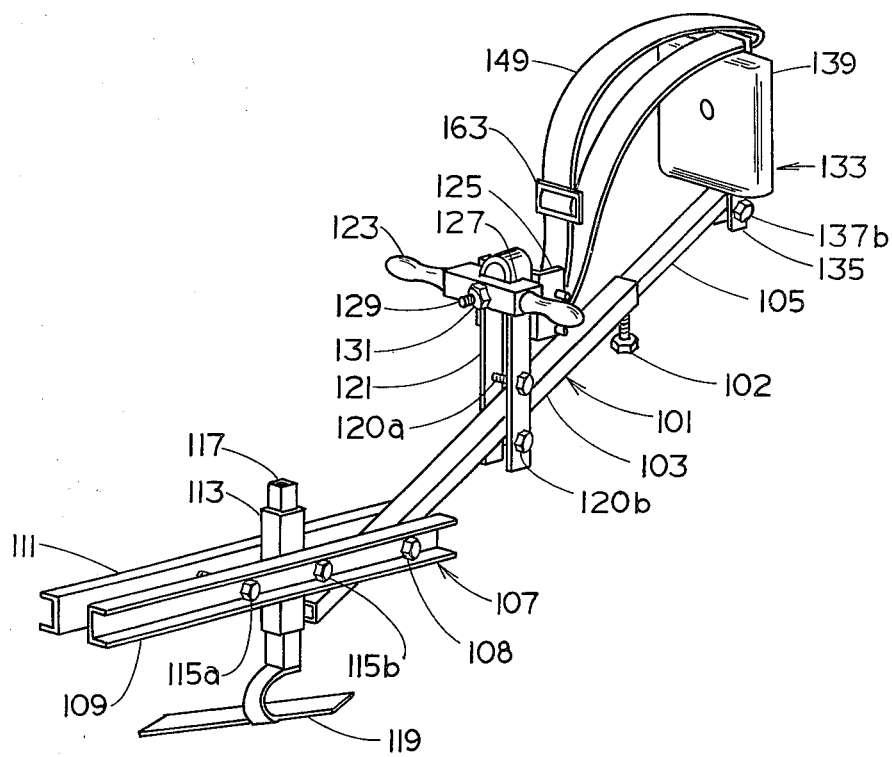
FIG. 4 is a perspective view of another preferred agricultural implement of the present invention.

FIG. 4 shows another preferred embodiment of the present invention and comprises an elongated body support member 101 which includes two elongated rectangular tubular members 103 and 105 in telescoping relation, tube 105 being received within tube 103. Tubes 103 and 105 are held in fixed relation upon adjustment to a desired length by an adjusting set screw 102, set screw 102 being received through an apeture (not shown) in one wall of tube 103.

Tubular member 103 receives at the opposite end thereof a cultivating assembly 107, cultivating assembly 107 including a pair of spaced channel members 109 and 111, respectively, with tubular member 103 being received therebetween. The channel members 109 and 111 are attached by a bolt member 108 which extends through aligned apertures in the members 109 and 111, cultivating assembly 107 being held in place by tightening of the bolt 108.

Channel members 109 and 111 also receive therebetween a rectangularly-shaped tubular support member 113 which extends downwardly therefrom and substantially perpendicular thereto, support member 113 being adjustably held in position by bolt members 115a and 115b which are on opposed sides of member 113 extending through and received by aligned apertures in channels 109 and 111. Support member 113 telescopically receives therein a downwardly extending rectangular-shaped tubular member 117 which has a cultivating implement 119 attached at its lower extremity. Tubular member 117 has an outer periphery of substantially the same size and dimensions as the inner periphery of the support member 113. Means for adjusting or positioning the cultivating implement 119 may be by any known means.

Disposed approximately midway of the elongated member 103 is an upwardly extending U-shaped handle support member 121, inversely disposed with legs of support member 121 straddling the elongated member 103. Support member 121 is attached to elongated member 103 by any known means, such as bolt members 120a and 120b which are received through aligned apertures (not shown) in opposing legs of support 121 on opposite sides of elongated member 103.

Support member 121 receives a handle 123 and belt adjusting bracket 125 at a preselected position along its length, as desired by an operator. Handle 123 includes a notch 127 therein receiving the support member 123 therethrough. Generally, the depth of the notch 127 is less than the width of the legs of the support 121 so the edges of the legs extend outwardly beyond handle 123. A bracket 125 is attached to the handle 123 by a threaded bolt member 129 and nut 131 with the support 121 disposed therebetween. As noted previously, since the legs of support 121 extend outwardly beyond handle 123, by tightening bolt 129, bracket 125 and handle 123 are held tight against support member 121.

Figure 5:
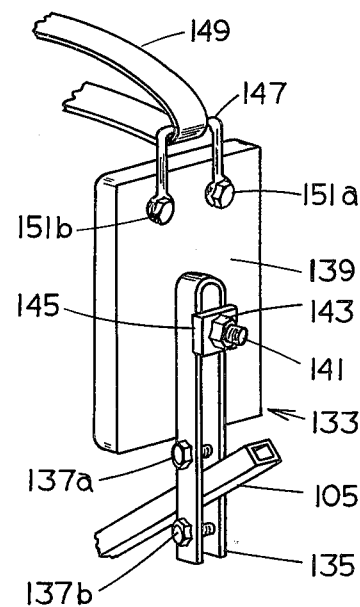
FIG. 5 is an enlarged perspective view of the seat and belt attaching means for the agricultural implement of FIG. 4.

Tubular support member 105 receives at the end opposed to the connection with support member 103 a body support mounting assembly 133 (FIG. 5). The body support mounting assembly 133 includes a U-shaped support member 135, inversely disposed, with legs of the support 135 straddling the elongated member 105. Support member 135 is attached to elongated member 105 by any known means, such as bolt members 137a and 137b which are received through aligned apertures (not shown) in opposing legs of support 135 on opposite sides of elongated member 105.

A padded vertically extending body support member 139 is attached to the support member 135 at its upper extremity by bolt member 141 and nut 143 with washer 145 being sandwiched between nut 143 and support 135. Washer 145 and padded support member 139 upon tightening bolt member 141 hold padded support member 139 tight against U-shaped support member 135.

Padded body support member 139 further includes an inversely disposed U-shaped belt support 147 at the top thereof to receive belt 149 therearound. U-shaped belt support 147 is attached to the body support member 139 by a pair of bolts 151a and 151b which extend through apertures (not shown) in the lower extremity of each leg of the support 147 and into support 139.

Figure 6:
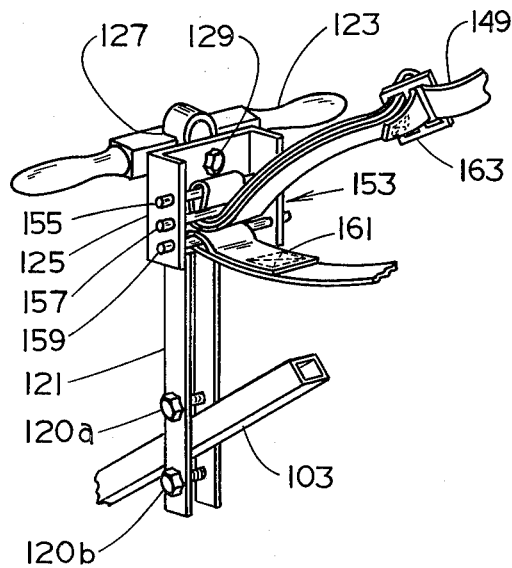
FIG. 6 is an enlarged perspective view of handle means shown in FIG. 4.

In FIG. 6, a belt adjusting assembly 153 is shown. Belt adjusting assembly 153 includes the C-shaped bracket 125 to which three parallel rods 155, 157 and 159 are attached. Parallel rods 155, 157 and 159 extend through aligned apertures (not shown) in opposed legs of bracket 125 and are affixed thereto. One end of belt 149 loops around rod 159 and is sewn thereto as noted by the numeral 161 with the opposite end looping around rod 155 and doubling back underneath rod 157.

The opposite end of belt 149 is sewn to buckle 163 (FIG. 4), buckle 163 having another portion of the belt 149 passing therethrough to enable adjusting of the belt 149 to allow an operator easy access to the implement. Easy access is further enhanced by slippage of the belt around its rear support 147 lengthening one section for passage over the head. Furthermore, adjusting of the belt length changes the angle of the elongated body member 101 thereby changing the angle the cultivating implements enter the ground.

In FIG. 7, another preferred cultivating assembly 200 for use with the agricultural implement in FIG. 4 is shown. Cultivating assembly 200 includes spaced parallel channel members 109 and 111 hereinbefore described with tubular support member 113 disposed therebetween. Cultivating assembly 200 is further provided with a pivotally attached auxiliary shank mounting assembly 220 at one end thereof. Mounting assembly 220 includes clamping channel supports 222 and 232, of similar shape, having opposed end flanges are disposed on opposite sides of the junction of the cultivating assembly 200 and shank mounting assembly 220 clamping of the assemblies is by bolt member 226 through apertures in the aforementioned channels, sandwiching therebetween a pair of tubular supports 228 and 230 to the spaced channel members 109 and 111, providing quick detachment of the auxiliary assembly 220.

Tubular supports 228 and 230 carry shank receiving supports 234 and 236 at desired settings along their length. Tubular shank receiving supports 234 and 236 are of U-shaped cross-section, inversely disposed, with one end of the top wall cut-out to receive a tubular shank receiving member therein and welded thereto. These welded units are carried in transverse and pivotal adjustment to tubular supports 228 and 230 by clamping action of bolts 236b and 234b, and apertures in the top walls of supports 234 and 236, nuts, (not shown), being provided. Support 234 receives shank receiving member 238 and support 236 receives shank receiving member 240. Tubular shank receiving members 238 and 240 receive shanks 242 and 244, respectively, therein, shanks 242 and 244 being attached at their lower extremity to a desired cultivating implement, such as the ground working member shown in FIG. 9. FIG. 9 shows a ground working member 241 welded to shank 244.

Shanks 242 and 244 are shows as rectangular-shaped tubes with a concavity on one side thereof to receive a cam-shaped key lever therein. The cam is usually provided with a flattened side so upon insertion between a shank and a shank receiving member, the side toward the shank receiving tube member being positioned to hold the shank in the shank receiving member at a desired position. Shank 242 is shown with cam member 246 wedged therein.

In one example shown, the tubular support member 113 receives a rectangularly-shaped tubular shank 262 with a cultivating implement 260 attached at the lower extremity thereof. Shank 262 is provided with a concavity on one side thereof to receive a cam key lever 264 therein. Lever 264 being disposed between shank 262 and tubular support member 113 upon turning locks the shank 262 therein at a preselected position.

In FIG. 8, a detachably mounted cultivating tool receiving assembly 300 is mounted onto the ends of the spaced parallel channel members 109 and 111 hereinbefore described. The assembly 300 includes a plurality of rectangular-shaped tubular shank receiving members 302, 304 and 306. Members 304 and 306 are welded together and a pair of spaced flat support members 308 and 310 are welded at each end to members 302 and 304, the length of the support members 308 and 310 and the spacing therebetween being sufficient to fit over the ends of the channel members 109 and 111. An elliptically-shaped tubular spacing member 312 is provided between the spacing defined by the ends of the channel members 109 and 111. A pair of aligned apertures 314, only one being shown, are provided in one end of the spacing member 312 for receiving a tool therein to adjustably space the channel members 109 and 111 to provide a snug fit between the channel members 109 and 111 and the receiving assembly 300.

Spacer straps may be provided to give a snug fit between the shank receiving members and the shank of the cultivating implement when needed. For example, shank receiving tube 302 is provided with a strap 316, strap 316 being shown prior to bending into a desired position. Strap 316 is inserted into the receiving tube 302 and both ends of the strap 316 are bent flat against the outside of the tube 302 as shown.

A alternative detachably mounted cultivating assembly 400 may also be mounted onto the spaced parallel channel members 109 and 111 using the elliptically-shaped spacer 312 as hereinbefore described. The assembly 400 includes a pair of tubular support members 402 and 404 attached end to end with a spacing therebetween, the spacing being defined by the channels 109 and 111 therebetween. Means for attaching support members 402 and 404 are a pair of flat plate members 406 and 408 welded to the tops and bottoms, respectively, of the support members 402 and 404.

One adjustably mounted tubular shank receiving support 410 is provided and mounted onto the support 402 by means of a cam key lever 412 and a slider sleeve 414. Sleeve 414 of substantially C-shaped cross-section with an irregularly-shaped portion therein to receive lever 412, is welded at each end to the shank support 410. Positioning of shank recieving support 410 along support member 402 enables considerable flexibility in the positioning of the cultivating implements. By positioning appropriate cultivating implements at selected positions along the supports 402 and 404 it is possible to cultivate two rows at a time or perform different cultivating operations at the same time, alternating direction of travel each successive cultivation. Slider sleeve 414, when reversed on support 402, together with reversal of the shank allows positioning of one ground working member more forwardly than the other.

In FIG. 10, another means of attaching a cultivating member to the body member of the implement shown in FIG. 4 is shown. In FIG. 10, cultivating implement 252 is attached to a U-shaped member 251 with a bolt 262 and a washer 260. The legs of member 251 straddle one end of body member 103 and are attached by any known means, such as bolts 264 and 266 through aligned apertures (not shown) on either side of body member 103. Furthermore, outriggers carrying supplementary cultivating implements in a manner hereinbefore described may be mounted on the U-shaped member 251 by any known means.

It is realized that various changes may be made to the specific embodiments that I have shown and described without departing from the scope and spirit of the present invention.

What is claimed is:

1. An agricultural implement of the walking type comprising:
   an elongated body member having a cultivating assembly attached at one end thereof and a body support assembly attached at the opposed end thereof extending substantially vertically upwardly therefrom with a handle means attached thereto and disposed between said cultivating assembly and said body support assembly;
   said cultivating assembly including a downwardly extending cultivating member and said elongated body member extending angularly in an upwardly direction in an operating position, said cultivating member including a cultivating edge directed towards an operator in said operating position, said cultivating edge being structured to facilitate digging by said edge into the ground when said edge is moved in the direction of the operator; and
   harness means attached at one end to said body support assembly and the other end to said handle member, said harness means including means for hitching an operator therein.

2. The agricultural implement of claim 1, said elongated body member being a pair of elongated rectangular tubular members disposed in telescoping relation.

3. The agricultural implement of claim 1, said handle means includes a U-shaped handle support, inversely disposed and adjustably received by said elongated body member, said support receiving a handle member thereon.

4. The agricultural implement of claim 1, said body support assembly having a body support mounting assembly including a U-shaped support member, inversely disposed and adjustably received by said elongated body member, said support receiving a vertically extending body support member attached thereto.

5. The agricultural implement of claim 1, said cultivating assembly including a pair of spaced opposed channel member with said elongated body member disposed therebetween, said channel members being adjustably received onto said elongated body member.

6. The agricultural implement of claim 5, said spaced opposed channel members adjustably receives therebetween at least one tubular shank support member, said tubular shank support member telescopically receiving a shank therein, said shank having a cultivating member attached thereto.

7. The agricultural implement of claim 5, said spaced opposed channel members including an elliptically-shaped tubular spacing member therebetween.

8. The agricultural implement of claim 5, said spaced opposed channel members having pivotally attached thereto a shank mounting assembly having a plurality of tubular shank receiving supports attached thereto.

9. The agricultural implement of claim 8, said tubular shank receiving supports telescopically receiving a shank of a cultivating member, said shank having a concavity on one side and receiving a cam key therein, said cam key being positioned between said shank and said tubular shank receiving support.

10. The agricultural implement of claim 8, said tubular shank receiving supports being attached to a transversely extending sliding sleeve, said sleeve receiving in telescoping relation a horizontal support member, said sleeve being spaced from said shank receiving support member with a wedge means disposed therebetween.

* * * * *